US008242621B1

(12) United States Patent
Tate et al.

(10) Patent No.: US 8,242,621 B1
(45) Date of Patent: Aug. 14, 2012

(54) ENERGY-HARVESTING, SELF-PROPELLED BUOY

(75) Inventors: Ralph E. Tate, Arlington, TX (US); Toby D. Thomas, Southlake, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 559 days.

(21) Appl. No.: 12/543,905

(22) Filed: Aug. 19, 2009

Related U.S. Application Data

(60) Provisional application No. 61/090,540, filed on Aug. 20, 2008.

(51) Int. Cl.
*F03B 13/10* (2006.01)
(52) U.S. Cl. ............... 290/53; 290/42; 417/331
(58) Field of Classification Search .............. 290/42, 290/43, 53, 54; 417/331
See application file for complete search history.

(56) References Cited

U.S. PATENT DOCUMENTS

| | | | | |
|---|---|---|---|---|
| 4,421,461 | A | * | 12/1983 | Hicks et al. ............... 417/53 |
| 5,552,657 | A | * | 9/1996 | Epstein et al. ............. 310/339 |
| 6,020,653 | A | * | 2/2000 | Woodbridge et al. .......... 290/53 |
| 6,644,027 | B1 | * | 11/2003 | Kelly ..................... 60/498 |
| 7,023,104 | B2 | * | 4/2006 | Kobashikawa et al. ......... 290/42 |
| 7,078,827 | B2 | * | 7/2006 | Brewington .................. 290/53 |
| 7,164,212 | B2 | * | 1/2007 | Leijon et al. ............... 290/42 |
| 7,298,054 | B2 | * | 11/2007 | Hirsch ..................... 290/42 |
| 7,535,117 | B2 | * | 5/2009 | Montgomery ................. 290/53 |
| 7,538,445 | B2 | * | 5/2009 | Kornbluh et al. ............. 290/53 |
| 7,557,456 | B2 | * | 7/2009 | Kornbluh et al. ............. 290/42 |
| 7,759,813 | B2 | * | 7/2010 | Fujisato .................... 290/53 |

* cited by examiner

*Primary Examiner* — Nicholas Ponomarenko
(74) *Attorney, Agent, or Firm* — Slater & Matsil, L.L.P.

(57) ABSTRACT

An energy-harvesting, self-propelled buoy includes a housing, an inertial power pump for converting wave motion to electrical energy, an electrical energy storage pod operably associated with the inertial power pump, and a propulsion unit for propelling the buoy. The inertial power pump is extensible from the housing.

17 Claims, 5 Drawing Sheets

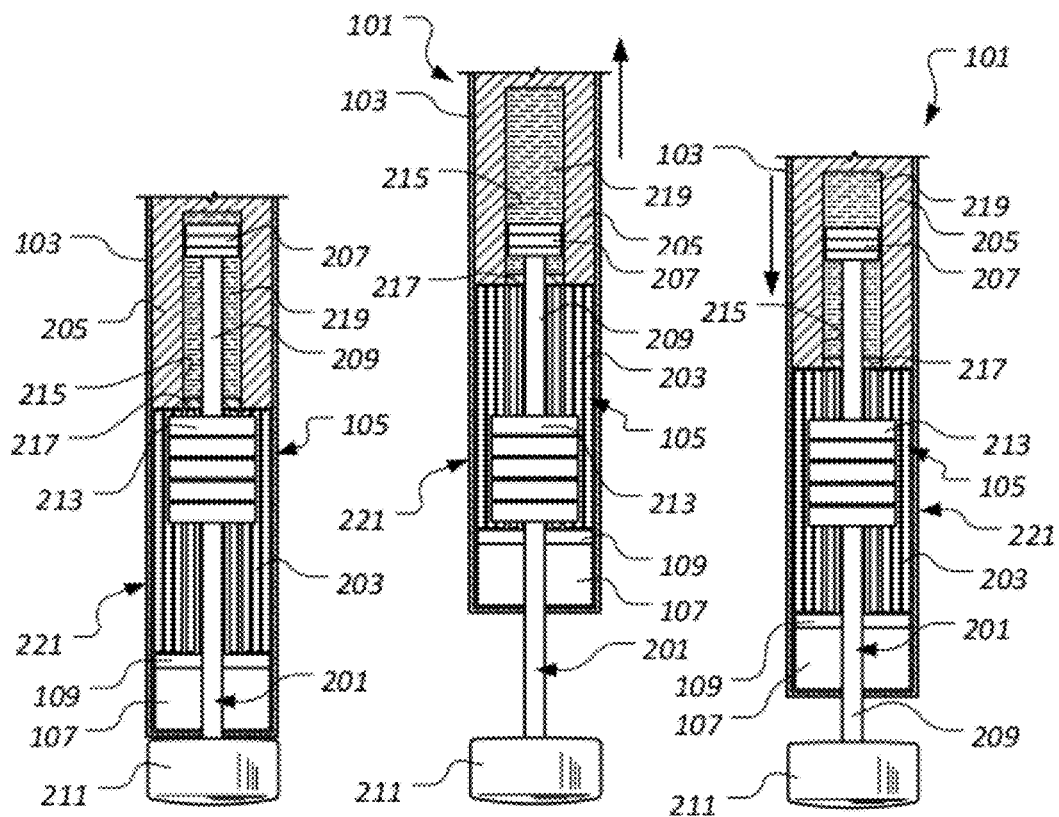
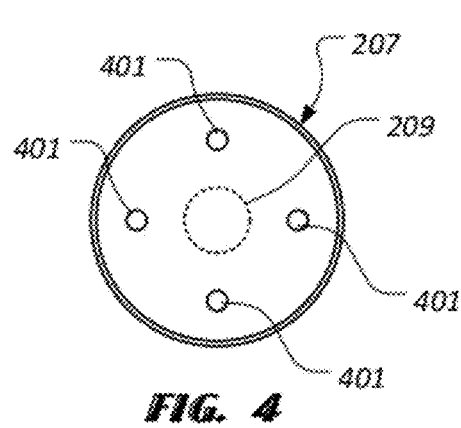
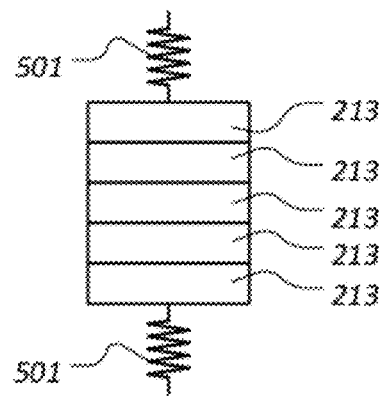

ENERGY-HARVESTING, SELF-PROPELLED BUOY

CROSS-REFERENCE TO RELATED APPLICATIONS

This application claims the benefit of U.S. Provisional Application No. 61/090,540, filed 20 Aug. 2008, and entitled "Energy-Harvesting, Self-Propelled Buoy," which is hereby expressly incorporated by reference for all purposes.

BACKGROUND

1. Field of the Invention

The present invention relates to water-borne buoys.

2. Description of Related Art

Buoys are conventionally used in many various implementations. Simple buoys are routinely used to mark boundaries, such as swimming areas, boat lanes, and the like, in bodies of water. More complex buoys are often used to monitor atmospheric conditions, hydrologic conditions, or the like. Such complex buoys include devices that require electrical power, typically supplied by batteries that are periodically replaced or that are recharged using solar power. Operational difficulties often arise when replacement batteries are not provided in a timely fashion or when overcast periods of time preclude efficient battery charging.

Moreover, conventional buoys are either anchored or allowed to drift. Repositioning an anchored buoy can be a substantial undertaking, requiring personnel to physically unanchor the buoy and move the buoy to the new, desired location. Drifting buoys are unacceptable solutions when the implementation requires the buoy to remain in a generally fixed location.

There are many designs of buoys well known in the art, however, considerable shortcomings remain.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIGS. 2A-2C are cross-sectional views of an illustrative embodiment of a portion of the buoy of FIG. 1, taken along the line 2A-2A in FIG. 1;

FIG. 4 is top, plan view of an illustrative embodiment of a piston of the buoy of FIG. 1;

FIG. 5 is a stylized view of an alternative, exemplary damping configuration of the buoy of FIG. 1;

Figure 1:
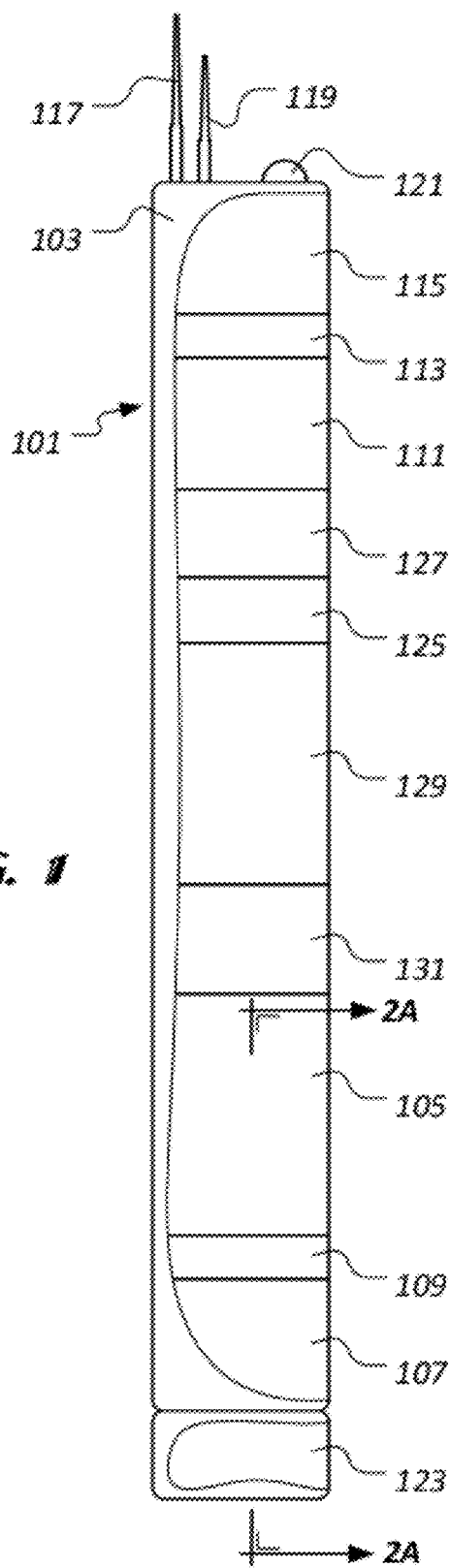
FIG. 1 is a side, elevational view of an illustrative embodiment of an energy-harvesting, self-propelled buoy.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an energy-harvesting, self-propelled buoy capable of maintaining a generally fixed position on a body of water, such as an ocean, a sea, a lake, or the like, for a period of time without the use of an anchoring device. The energy-harvesting, self-propelled buoy includes one or more energy storage devices. Electrical energy is provided to the one or more energy storage devices by a generator that is driven by ambient energy in the body of water, i.e., wave action. The buoy is capable of propelling itself to maintain a desired position or to relocate to a new desired position. Electrical energy stored in the one or more energy storage devices is used to power the buoy's self-propelling means, as well as to power other electrical or electronic devices of the buoy.

FIG. 1 depicts a stylized, side, elevational view of an illustrative embodiment of an energy-harvesting, self-propelled buoy 101, in which a portion of an housing 103 has been removed to reveal components disposed within housing 103. Preferably, housing 103 is made from a seawater-resistant, non-corrosive material. Buoy 101 comprises an inertial power pump 105 that, when in use, generates electrical power from wave action of the body of water in which buoy 101 is disposed. Electrical energy generated by power pump 105 is stored in an electrical energy storage pod 107. Electrical energy storage pod 107 comprises one or more electrical energy storage devices, such as batteries, for example, lithium-ion batteries, nickel metal hydride batteries, lead acid batteries, or the like. Alternatively or in addition to batteries, electrical energy storage pod 107 may comprise solid-state capacitive electrical energy storage devices, such as the electrical energy storage unit described in U.S. Pat. No. 7,033,406 to Weir et al., which is incorporated herein by reference for all purposes. Buoy 101 includes a power management system 109 for charging electrical energy storage pod 107, for monitoring power consumption of various subsystems of buoy 101, for conditioning power for various subsystems of buoy 101, and the like. Power management system 109 is capable of shutting down or commanding a sleep mode for any subsystems of buoy 101, such as subsystems that are unnecessary at a particular time, in order to enhance power conservation.

Buoy 101 further comprises a propulsion unit 111 powered by electrical energy from electrical energy storage pod 107. Propulsion unit 111 is capable of propelling buoy 101 to maintain a desired position or to reposition buoy 101 to a new desired position. A controller 113 controls the operation of propulsion unit 111 based at least in part upon current position data and desired position data obtained from a communications/navigation unit 115. Communications/navigation unit 115 includes positioning system electronics for the global positioning satellite (GPS) system, the differential global positioning satellite (DGPS) system, and/or the like. Communications/navigation unit 115 further includes data link electronics for transmitting data acquired by buoy 101 and for receiving command signals for the onboard systems of buoy 101. Communications is accomplished via one or more antennas 117 and 119 that extend from housing 103 of buoy 101. Data may be transmitted immediately or stored and transmitted at a later time.

Still referring to FIG. 1, buoy 101 further comprises sensors, such as meteorological sensor 121, hydrophones 123, and/or the like. Data from such sensors may be transmitted by communications/navigation unit 115. Hydrophones 123, such as SSQ-53 and/or SSQ-57 hydrophones, are operated by a sonar unit 125, which is operably associated with communications/navigation unit 115. Buoy 101 is capable of deploying hydrophones 123 or other such sensors, to depths of at least 100 feet. In certain embodiments, buoy 101 may also include a spoofing unit 127, a jamming unit 129, an anti-tamper unit 131, and/or the like. Spoofing unit 127 includes one or more devices, systems, or the like for deceiving an adversary by providing false information. For example, spoofing unit 127 may be operable to cause many separate targets to appear, cause a target appear to disappear, and/or cause a target to move about randomly. Jamming unit 129 includes one or more devices, systems, or the like for disrupting a signal, such as an acoustic or electromagnetic signal, of an adversary by, for example, overpowering a signal so that a receiver is overwhelmed and cannot process the signal. Other such spoofing and/or jamming countermeasures are contemplated by the present invention. Anti-tamper unit 131 includes one or more devices for disabling or destroying portions or an entirety of buoy 101 in the event that an unauthorized person or device attempts to tamper with buoy 101.

It should be noted that the particular subsystems of buoy 101, such as, for example, sonar unit 125, hydrophones 123, spoofing unit 127, jamming unit 129, anti-tamper unit 131, and the like, are merely exemplary of the many various subsystems that the present invention contemplates for buoy 101. Moreover, the particular positioning of the subsystems of buoy 101 within housing 103 depicted in FIG. 1 is merely exemplary of the innumerable configurations contemplated by the present invention.

FIGS. 2A-2C show a partial cross-sectional view of a portion of an illustrative embodiment of buoy 101, taken along the line 2A-2A in FIG. 1, depicting an exemplary operation of an illustrative embodiment of inertial power pump 105. In the illustrated embodiment, inertial power pump 105 comprises a piston assembly 201, a plurality of electrical coils 203, and a cylinder 205. Piston assembly 201 comprises a piston 207 disposed at a first end of a rod 209 and a member 211 disposed at a second end of rod 209. Member 211 may house one or more elements or subsystems of buoy 101, such as hydrophones 123 (shown in FIG. 1). Rod 209 extends into housing 103 of buoy 101. Disposed between piston 207 and member 211 are one or more magnets 213 (only one labeled in FIGS. 2A-2C for clarity). In one embodiment, the one or more magnets are high Gauss, rare-earth magnets. Piston 207 is disposed in a cavity 215 defined by cylinder 205, such that rod 209 extends through a seal 217 substantially sealing cavity 215. Disposed within cavity 215 about piston 207 is a fluid 219. Piston assembly 201 slides freely with respect to the plurality of coils 203, except as restrained by the interaction between piston 207 and fluid 219, which is discussed in greater detail herein.

Figure 3:
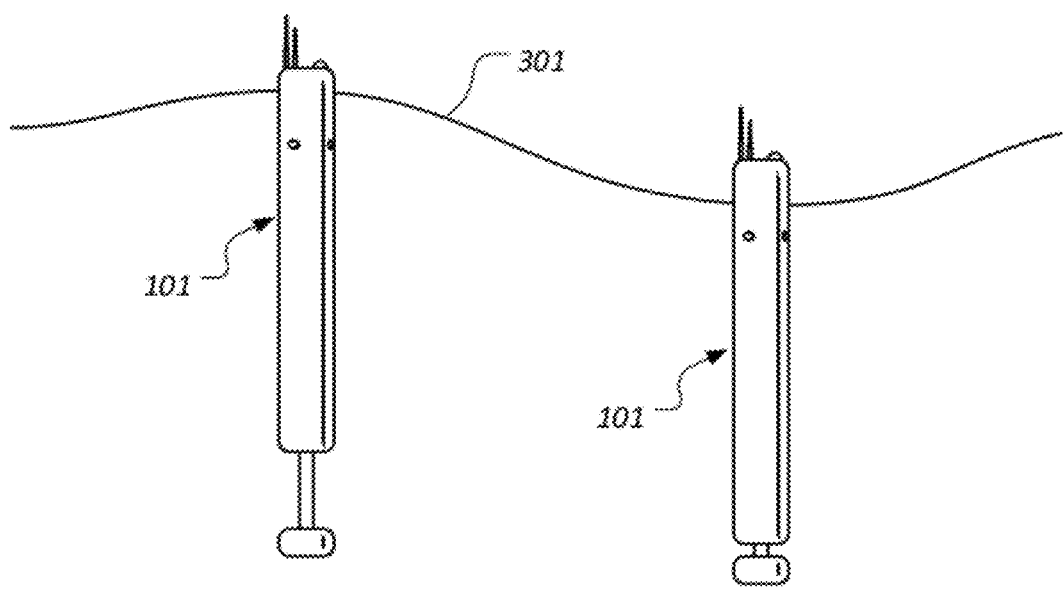
FIG. 3 is a stylized, side, elevational view depicting the buoy of FIG. 1 in an exemplary implementation.

When disposed in a body of water and in use, an upper portion 221 of buoy 101, i.e., elements of buoy 101 except for piston assembly 201, is buoyant. Piston assembly 201, however, is not buoyant in water. Thus, waves, such as wave 301, move upper portion 221 with respect to piston assembly 201, as best shown in FIG. 3, causing the plurality of coils 203 to move with respect to the one or more magnets 213. A magnetic field formed about the one or more magnets 213 induces a voltage in the plurality of coils 203 as the one or more magnets 213 move with respect to the plurality of coils 203. Electrical energy thus generated is managed by power generation system 109 and is stored in electrical energy storage pod 107.

The physical dimensions of the one or more magnets 213 and the plurality of coils 203 are sized to preferably provide the maximum electrical energy available in the limited physical confines of buoy 101. The electricity produced is routed through power management system 109, where it is available for recharging electrical energy storage pod 107. Power management system 109 includes a charger capable of capturing and transferring intermittent energy bursts from inertial power pump 105 to electrical energy storage pod 107.

In the embodiment illustrated in FIGS. 2A-2C, the movement of upper portion 221 of buoy with respect to piston assembly 201 is damped by an interaction between piston 207 and fluid 219. As shown in FIG. 4, which is a top, plan view of piston 207, piston 207 includes one or more adjustable openings 401 extending through piston 207. Adjustable openings 401 control the extent to which fluid 219 can flow from a first side of piston 207 to a second side of piston 207. For example, adjustable openings 401 can be made fully open, thus allowing a free flow of fluid 219 through piston 207 and providing minimal damping. Adjustable openings 401 can be made fully closed, thus inhibiting any flow of fluid 219 through piston 207 and substantially preventing piston assembly 201 from moving with respect to upper portion 221 of buoy 101, for example, to place buoy 101 in a stowed, retracted configuration. Adjustable openings 401 can be made partially open, in varying degrees of openness, to vary the flow of fluid 219 through piston 207 and, thus, vary the damping of movement between upper portion 221 of buoy and piston assembly 201. Openings 401 are made adjustable by, for example, operably associating a valve with each of openings 401. The present invention contemplates some openings 401 being adjustable while other openings 401 are not adjustable.

The present invention contemplates other ways of damping movement between upper portion 221 of buoy and piston assembly 201. For example, as shown in FIG. 5, the one or more magnets 213 may be operably associated with mechanical biasing devices 501, such as springs, to provide such damping.

In one embodiment, the damping of inertial power pump 105 is determined based at least upon a "sea state" of the body of water in which buoy 101 is disposed. Low wave heights and frequencies are suited for low damping, i.e., little if any restriction on the flow of fluid 219 through piston 207. High sea states, i.e., high waves and/or high wave frequencies, are suited for high damping, i.e., more restriction on the flow of fluid 219 through piston 207. High damping inhibits inertial power pump 105 from damaging itself during rough seas.

Figure 6A:
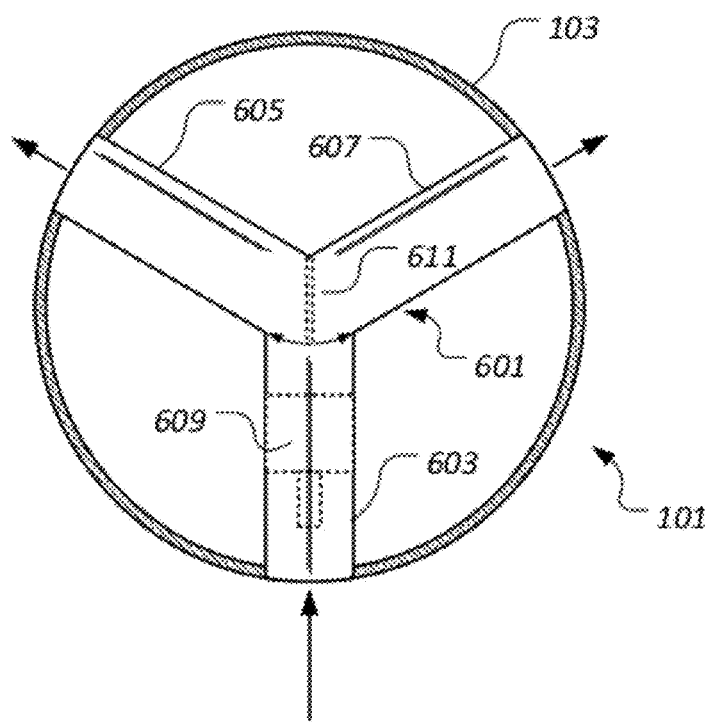
FIGS. 6A and 6B are top, plan views of an illustrative embodiment of a propulsion unit of the buoy of FIG. 1.
Figure 6B:
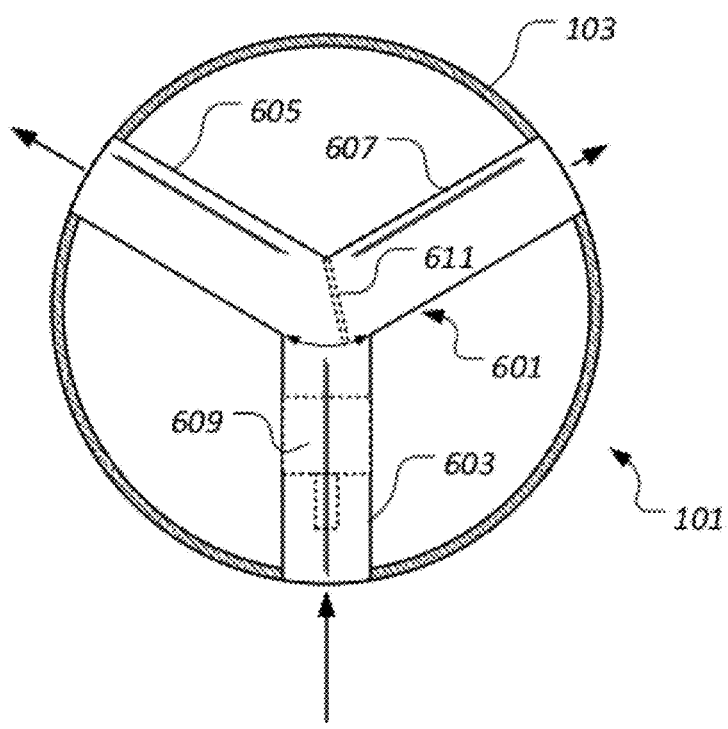

FIGS. 6A and 6B depict an illustrative embodiment of propulsion unit 111. In the illustrated embodiment, propulsion unit 111 comprises a "Y-shaped" tube 601 having an inlet leg 603 and two outlet legs 605 and 607. A pump 609 is disposed in inlet leg 603. Pump 609, when operated, urges water from the body of water in which buoy 101 is disposed into inlet leg 603 and out of one or both of outlet legs 605 and 607. A flap valve 611 is operated to control the amount of water flow through each of outlet legs 605 and 607. As shown in FIG. 6A, flap valve 611 is positioned to provide generally equal flows of water through each of outlet legs 605 and 607. As shown in FIG. 6B, flap valve 611 is positioned to provide a greater water flow through outlet leg 605 than the water flow through outlet leg 607. Buoy 101 is propelled through the body of water by propulsion unit 111 and is steered by operating flap valve 611 to provide differential water flows through outlet legs 605 and 607.

Figure 7:
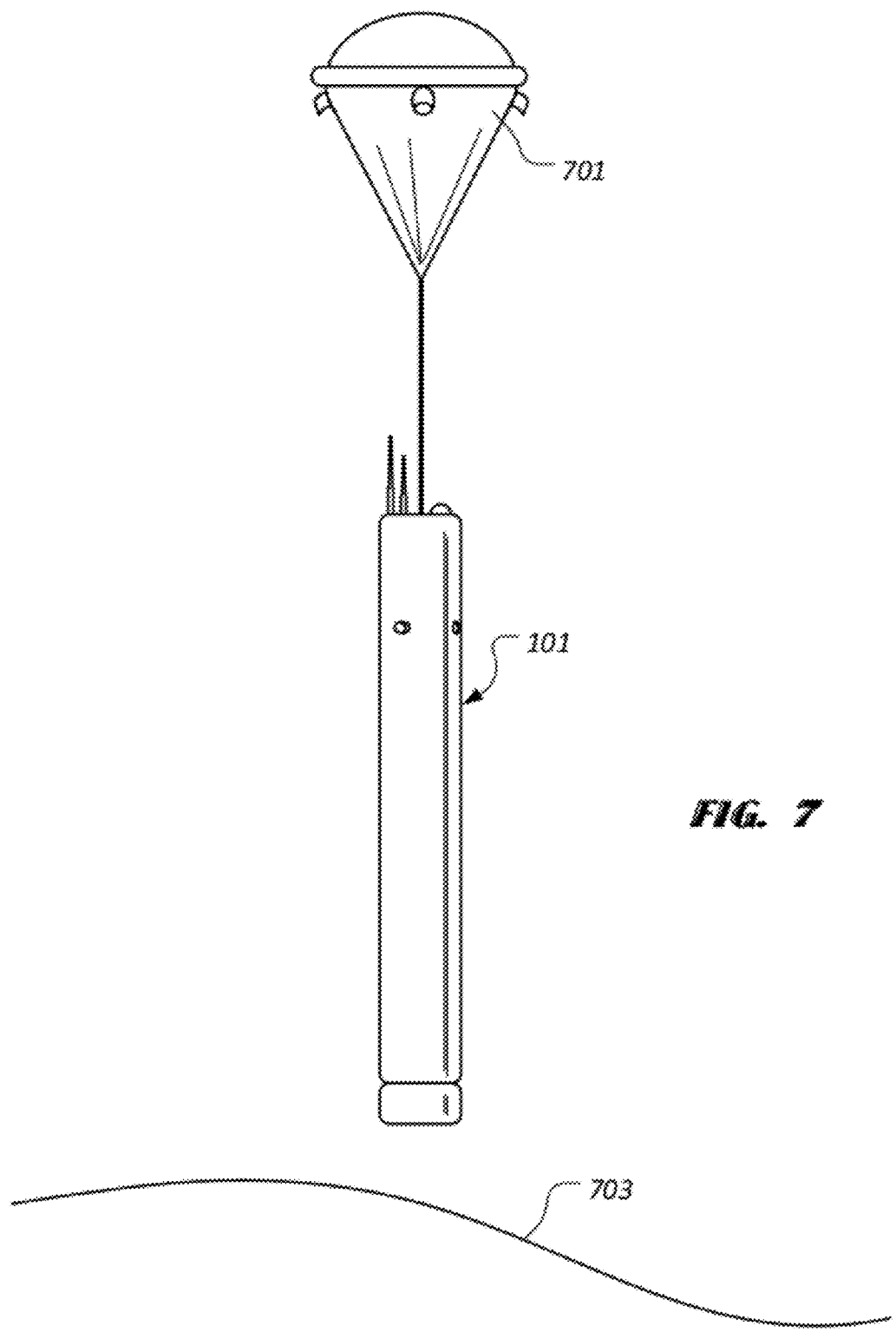
FIG. 7 is a stylized, side, elevational view depicting they buoy of FIG. 1 in an exemplary implementation.

Buoy 101 may be hand-placed in a body of water. In some situations, it may be difficult or impossible, however, to hand-place buoy 101 in a body of water. Accordingly, buoy 101 may be dropped from an aircraft into a body of water. In such situations, it is sometimes desirable to lessen the impact of buoy 101 with the body of water. Thus, the present invention contemplates operably associating buoy 101 with a drag-inducing device, such as a parachute 701, shown in FIG. 7, to retard the velocity of buoy 101 prior to impacting a body of water 703. In the illustrated embodiment, parachute 701 is a ballute; however, the present invention contemplates other types of parachutes, such as a drogue parachute. Buoy 101 deploys to an operational configuration upon entering the water. In some situations, parachute 701 aids in extending piston assembly 201 after buoy 101 enters the water, due to drag induced upon upper portion 221. Alternatively, buoy 101 provides one or more geared motors to extend piston assembly 201 in some embodiments.

In one embodiment, buoy 101 exhibits a diametrical dimension of about one foot, a stowed length of about 8% feet, an extended length of about 9% feet, and a weight of less than about 365 pounds. A center of gravity of buoy 101 is located below a geometric center of buoy 101. Buoy 101 includes, in some embodiments, flotation chambers to provide desired flotation characteristics. In some embodiments, buoy 101 is configured for operation at sea states up to Beaufort scale 6, e.g., 22-27 knots wind and 10-foot waves, and can survive varying littoral sea states, including up to Beaufort scale 10 e.g., 48-55 knots wind and 30-foot waves. In certain embodiments, buoy 101 is configured to maintain a position within a radius of about 250 meters for about 90 percent of its deployed time and to maintain a position within a radius of about 2500 meters for about 100 percent of its deployed time. Buoy 101, in some embodiments, is configured to be compatible with tactical and anti-submarine warfare aircraft operations. The buoy is configured to operate in at least one of a pre-programmed mode, an autonomous mode, and a real-time direction mode. In one embodiment, an acoustic signature of piston assembly 201 and/or pump 609 is attenuated by aspects of buoy 101 to reduce or minimize an acoustic signature of buoy 101.

The present invention contemplates many different means for lengthening or telescoping buoy 101 from its stowed length to its deployed length. In one embodiment, pressurized gas, such as air, is contained in a small cylinder. Upon impact the pressurized gas is used to urge or "blow down" piston assembly 201 (shown in FIG. 2) to the deployed configuration. In one particular configuration, the compressed gas is routed into cavity 215 of cylinder 205 (shown in FIG. 2), or into one or more extensible cylinders within buoy 101.

The present invention provides significant advantages, including (1) allowing the generation of electricity using motion of the water in which the buoy is disposed; (2) the ability to tune the electricity-generating mechanism to a particular sea state to enhance electrical power generation efficiency; (3) the ability to maintain a position within a body of water without an anchor; and (4) the ability of the buoy to reposition itself within a body of water.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An energy-harvesting, self-propelled buoy, comprising:
    a housing;
    an inertial power pump for converting wave motion to electrical energy, the inertial power pump extensible from the housing;
    an electrical energy storage pod operably associated with the inertial power pump; and
    a water driven propulsion unit for propelling the buoy;
    wherein the inertial power pump comprises:
    a plurality of electrical coils; and
    one or more magnets configured to be urged by wave motion to move along the plurality of coils.

2. The energy-harvesting, self-propelled buoy of claim 1, the inertial power pump further comprising:
    a cylinder defining a cavity;
    a rod;
    a piston disposed at a first end of the rod, the piston disposed in the cavity; and
    a member disposed at a second end of the rod;
    wherein the one or more magnets are affixed to the rod between the piston and the member.

3. The energy-harvesting, self-propelled buoy of claim 2, the inertial power pump further comprising:
    a fluid disposed in the cavity about the piston;
    wherein the piston defines at least one opening therethrough for flow of the fluid.

4. The energy-harvesting, self-propelled buoy of claim 3, wherein the openings are adjustable openings.

5. The energy-harvesting, self-propelled buoy of claim 1, further comprising:
    a navigation system.

6. The energy-harvesting, self-propelled buoy of claim 1, further comprising:
    at least one of a receiver and a transmitter; and
    an antenna for receiving or transmitting at least one of global positioning system data, differential global positioning system data, and radio frequency data.

7. The energy-harvesting, self-propelled buoy of claim 1, further comprising:
    a hydrophone.

8. The energy-harvesting, self-propelled buoy of claim 1, wherein the buoy is configured to operate in at least one of a pre-programmed mode, an autonomous mode, and a real-time direction mode.

9. The energy-harvesting, self-propelled buoy of claim 1, wherein the propulsion unit comprises:
   a Y-shaped tube having an inlet leg and two outlet legs;
   a pump disposed in the inlet leg; and
   a valve for adjusting outputs of the outlet legs.

10. The energy-harvesting, self-propelled buoy of claim 1, further comprising:
   at least one of a metrology sensor, a sonar unit, a spoofing unit, a jamming unit, and an anti-tamper unit.

11. The energy-harvesting, self-propelled buoy of claim 1, further comprising:
   a power management system for managing power generated by the inertial power pump.

12. The energy-harvesting, self-propelled buoy of claim 11, wherein the power management system is operable to manage power stored in the electrical energy storage pod.

13. The energy-harvesting, self-propelled buoy of claim 1, wherein mechanical operation of the inertial power pump is damped by mechanical biasing devices.

14. The energy-harvesting, self-propelled buoy of claim 1, wherein the buoy is operably associated with a drag-inducing device for retarding a speed of the buoy as the buoy is dropped in a body of water.

15. The energy-harvesting, self-propelled buoy of claim 14, wherein the drag-inducing device is a parachute.

16. The energy-harvesting, self-propelled buoy of claim 15, wherein the parachute is a ballute.

17. The energy-harvesting, self-propelled buoy of claim 1, wherein the buoy is capable of maintaining a position within a body of water during use within a predetermined zone.

* * * * *